United States Patent [19]
Tibbet

[11] Patent Number: 5,595,377
[45] Date of Patent: Jan. 21, 1997

[54] WORKPIECE PRESETTING ASSEMBLY

[75] Inventor: Michael D. Tibbet, Oxnard, Calif.

[73] Assignee: Gaiser Tool Co., Ventura, Calif.

[21] Appl. No.: 469,901

[22] Filed: Jun. 6, 1995

[51] Int. Cl.$^6$ .................................................... B23Q 3/02
[52] U.S. Cl. ................ 269/71; 269/244; 269/88
[58] Field of Search .................... 269/60, 61, 71, 269/73, 82, 88, 45, 303, 304, 309, 315, 900, 244

[56] References Cited

U.S. PATENT DOCUMENTS

| | | |
|---|---|---|
| 3,107,562 | 10/1963 | Miller . |
| 4,822,014 | 4/1989 | Buchler . |
| 4,993,785 | 2/1991 | Dunand . |
| 5,019,129 | 5/1991 | Johanson . |

OTHER PUBLICATIONS

3R–272J 3–Axes Levelling Adapter (Jan. 1991).
EROWA ManoSet, Clamps more, costs less, 1036 e/4000/3 92 (1992).
Mecatool ICS Schneiderosion Wire EDM, A 000014 D/E 4.92 (1992).
Concept WEDMing System 3R, T–1143–E 93.10 (1993).

*Primary Examiner*—Robert C. Watson
*Attorney, Agent, or Firm*—Kenneth J. Hovet

[57] ABSTRACT

A machine tool subassembly that holds a workpiece at a predetermined position within the operating area of a machining apparatus is attached to a presetting stand outside of the machine for purposes of aligning a workpiece during the time the machine is operating on another workpiece. The presetting stand is attached to a rail on the flat top surface of a support table. The stand and rail have mating reference surfaces that correspond to the orthogonal axis of the machine. The stand includes upper and lower joint parts which engage an adjustment part of the subassembly. The joint parts include reference surfaces aligned with the machine axis so that when the subassembly engages one of the joint parts, the workpiece secured therein my be aligned along two of the three orthogonal axis of the machine. When the subassembly is connected to the second joint part, it will be aligned precisely ninety degrees to the first joint part. In this position, the third axis of the workpiece may be precisely aligned without movement or alignment disruption of the presetting stand.

16 Claims, 2 Drawing Sheets

WORKPIECE PRESETTING ASSEMBLY

BACKGROUND OF THE INVENTION

1. Field of the Invention

The present invention relates to an assembly for orienting a workpiece relative to predetermined orthogonal references outside the operating area of a machining apparatus.

2. Description of the Prior Art

The invention has particular utility with precision machining apparatus that are able to operate on only one workpiece at a time. With such machines, it is desirable to minimize the down time required for removing a finished work and positioning a new blank into the machine.

To help diminish the above down time, it has been customary to provide a workpiece presetting station outside the machining apparatus. Thus, while the apparatus is operating on one workpiece, a second workpiece is being secured and oriented with a duplicate set of machine tool clamping mechanisms. When the changeover time occurs, it is then a simple matter to disconnect the first clamping mechanism from the machine and reconnect the duplicate mechanisms.

In the past, the workpiece was preset by precisely fixing a rail along a predetermined axis of a large, but movable, reference block. An adaptor was then used to interconnect the rail with a vise. The vise, in turn, held the workpiece.

To orient the workpiece along each orthogonal axis, the large block itself is set upon its side for one coordinate, its end for another and its bottom for another. In some cases, additional support blocks were required to uphold large overhanging workpieces.

In each position, a dial indicator is used in conjunction with adjustment means on the adaptor to obtain the desired alignment of the workpiece. It is critical that each side of each block have exact flat orthogonally aligned reference surfaces. Also, the underlying table supporting the blocks must be flat, level and absolutely clean.

SUMMARY OF THE INVENTION

The present invention avoids the multiple turning block system of the prior art. Instead, an upright stand has been developed which includes two joint parts that correspond with the clamping joint parts used in the machining apparatus. The joint parts are aligned ninety degrees from each other. Thus, precise alignment along all three orthogonal axes is achieved simply by attaching the machine clamping mechanism to one and then the other joint part.

The stand includes a bottom reference surface and a means for attachment to a rail. The rail, in turn, is fixed along a predetermined axis to a flat table surface upon which the stand rests. The rail and stand have mating reference surfaces when attached. Likewise, the joint parts have reference surfaces that precisely correspond to the rail/stand reference surfaces. Consequently, a machine tool workpiece subassembly can be used to precisely align a workpiece along predetermined orthogonal axes that correspond to those used in the machining apparatus.

DESCRIPTION OF THE PREFERRED EMBODIMENTS

Figure 4:
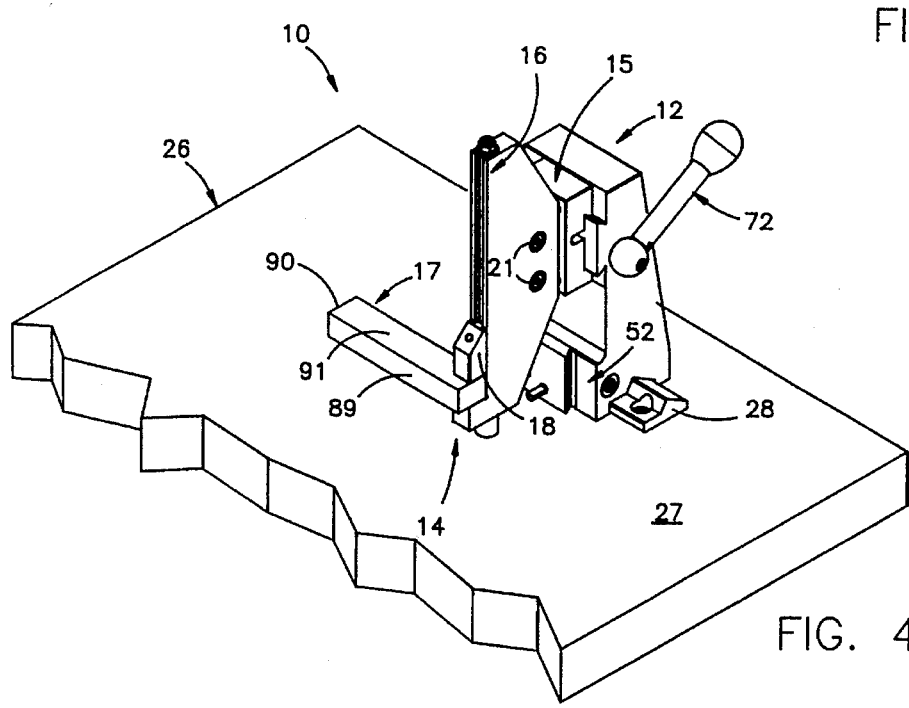
FIG. 4 is a front perspective view of the workpiece presetting stand of FIG. 1 secured to the rail on the support table with the workpiece subassembly connected to an upper joint part.
Figure 5:
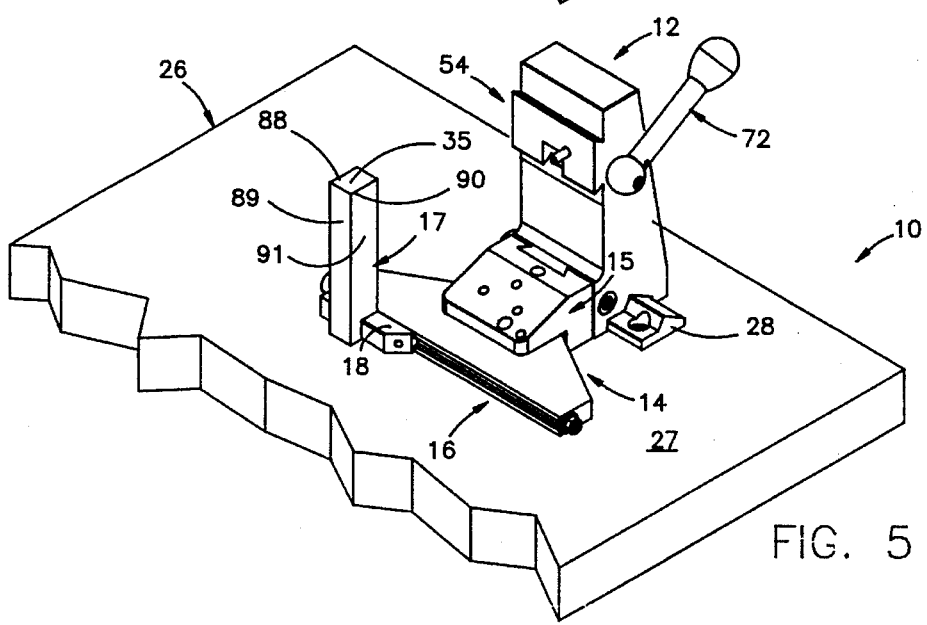
FIG. 5 is a view identical to FIG. 4 except the workpiece subassembly is connected to a lower joint part.

With reference now to FIGS. 4 and 5 of the drawings, presetting stand 12 is shown engaged with a machine tool workpiece subassembly 14 at presetting station 10. The workpiece subassembly 14 functions to adjustably align a workpiece at a predetermined location within the operating area of a machining apparatus. Once the workpiece is aligned, the subassembly functions to securely hold the workpiece in place during the machining operation.

For purposes of the present invention, a duplicate workpiece subassembly is used in conjunction with the unique presetting stand to prealign a workpiece before it is placed into the operating area of the machining apparatus. To accomplish the above, the presetting stand includes at least two joint parts that releasably engage the subassembly in the same manner as the subassembly engages a corresponding joint part in the machining apparatus.

The structure, function and operation of each part of the workpiece subassembly are set forth in applicant's co-pending U.S. application Ser. No. 08/288,067 now U.S. Pat. No. 5,487,538 which is herein incorporated by reference. In general, the subassembly comprises a workpiece adjustment part 15 and a clamping means shown in FIG. 1 as vise 16. The vise is configured to hold a polygonal shaped workpiece 17 by moving movable jaw 18 until it forces the workpiece against stationary jaw 19. Preferably, the jaw inner faces 81, 82 are flat and perpendicular to the vise front faces 25 and the vise upper surface 20. The upper surface and front faces are also preferably flat. Vise adaptors are commonly used to hold workpieces having curved or unusual configurations.

The workpiece adjustment part is secured to the vise upper surface 20 with connector bolts 21. The bolts extend through openings 23 in the vise body and engage threaded openings 22 in the adjustment part. The adjustment part further includes alignment means for adjusting its position in accordance with the desired workpiece position. The alignment means are more particularly described in the aforementioned co-pending application. They comprise a vertical adjustment means, a cant adjustment means and a lateral adjustment means. When all other parts are secured, the above alignment means are used to precisely true the position of the workpiece along predetermined orthogonal coordinates.

Figures 1, 2:
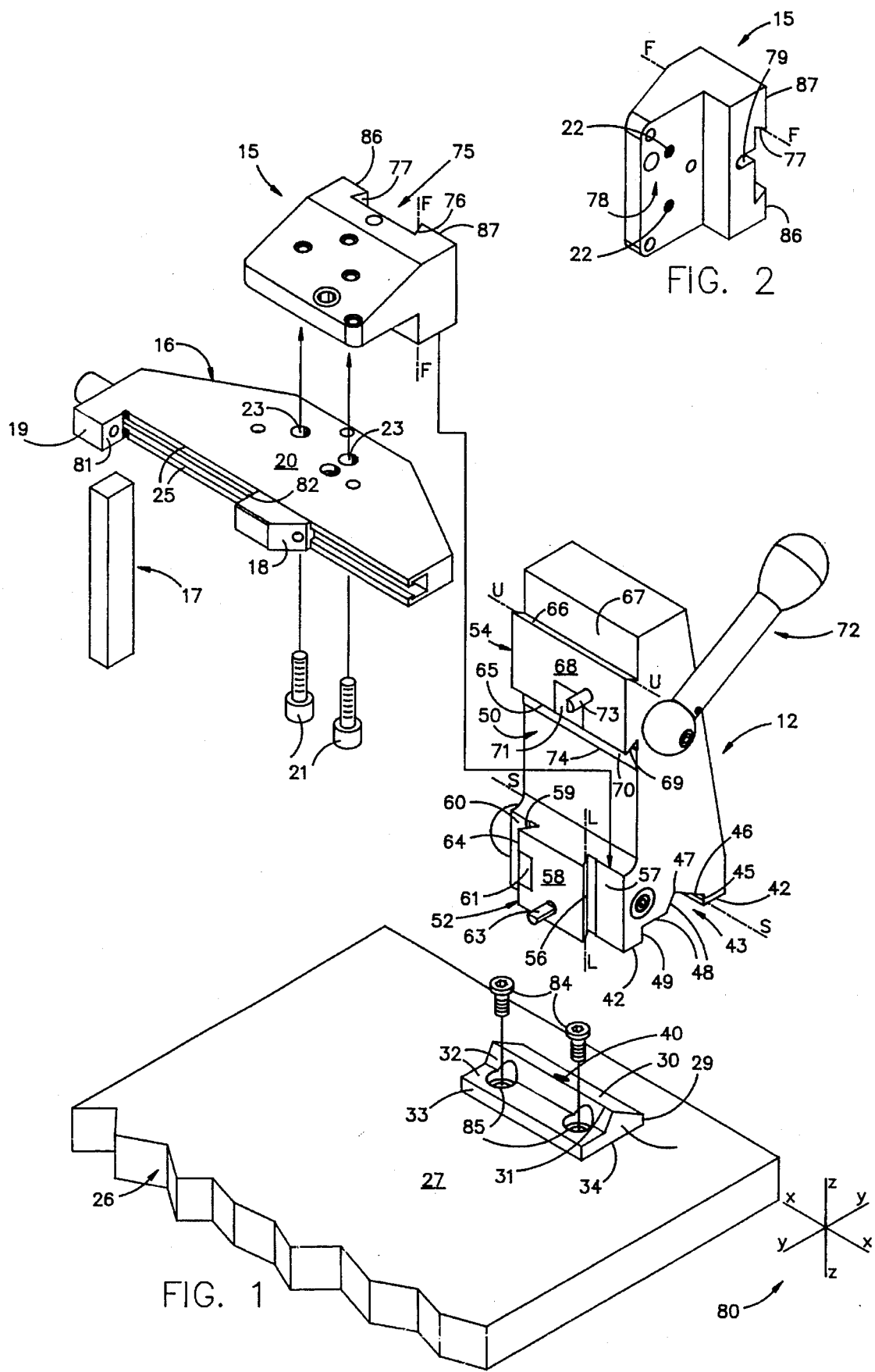
FIG. 1 is a front perspective view of the workpiece presetting stand of the invention positioned above a support table and rail with a workpiece subassembly including a workpiece adjustment part exploded therefrom.
FIG. 2 is an inverted rear perspective view of the workpiece adjustment part shown in FIG. 1.

The presetting station includes a support table depicted by reference 26. The table is provided with a flat top surface 27 to which rail 28 is securely fastened. With reference to FIG. 1, the rail includes a rail reference surface 29. The longitudinal axis of this surface is used as the x coordinate of the x, y, z orthogonal axes, shown by reference 80, used in the machining apparatus. As so aligned, the rail is secured to the top surface with rail fasteners 84 that pass through rail openings 85 and into the top surface.

The rail structure is defined by an upstanding rail reference surface 29 from which extends top wall 30. The top wall terminates at ridge 31. Diverging upper surfaces 32 extend from the ridge to the upper edge of rail front surface 33. The rail front surface extends down to the rail bottom 34. Preferably, the rail reference surface and rail bottom are flat and extend perpendicular to each other.

Figure 3:
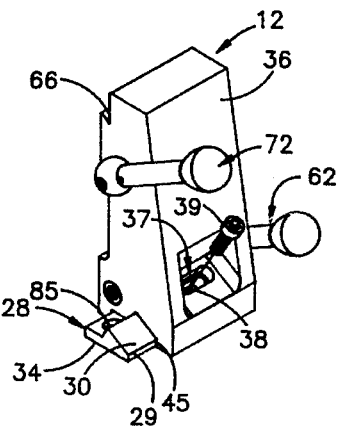
FIG. 3 is a rear perspective view of the presetting stand of FIG. 1 showing its connection to the rail.

As shown, presetting stand 12 comprises a solid block-like structure having flat bottom surfaces 42 that rest upon the flat top surface 27 of the support table. With reference to FIG. 3, its back side 36 is provided with a lower back opening 37. The back opening includes an elongated slot 38 extending through the lower part of the stand body. A stand fastener 39 is then used to extend through the slot and engage a corresponding stand fastener opening 40 in the top wall 30 of the rail. There is preferably more than one stand fastener opening in the rail to facilitate lateral positioning of the presetting stand. The elongated slot also permits lateral adjustability of the stand.

To enhance the secure connection between the presetting stand and rail, the stand bottom surface is provided with a rail slot 43 that corresponds to the cross-section of the rail. The cross section is characterized by a slot reference surface 45 from which extends an oblique wall 46. The oblique wall terminates at apex 47. Extending downwardly from the apex are angulated underside walls 48 which merge with underside front surface 49. The underside front surface corresponds to rail front surface 33.

Preferably, the slot reference surface comprises a flat elongated area which is perpendicular to the stand bottom surface 42. As shown in FIG. 1, its longitudinal axis is denoted with letters S,S.

It will be appreciated that the rail slot cross-section is slightly larger than the cross section of rail 28. It is further important to note that slot reference surface 45 and rail reference surface 29 will be drawn into mating engagement when stand fastener 39 draws the stand forward as it is tightened. In this way, all other surfaces that extend parallel to the slot reference surface will thereby be parallel with the rail reference surface and the x coordinate of the machining apparatus.

Although the rail slot is shown extending transversely across the entire bottom width of the presetting stand, it could be closed at one or both ends and simply comprise a notch in the bottom surface. In such case, the rail length would be correspondingly shortened.

The stand front side 50 is provided with a lower joint part 52 and an upper joint part 54. Preferably, the joint parts are identical with each other in cross-sectional configuration. They each comprise one part of a complete joint that interconnects the workpiece subassembly to the presetting stand. Although other joints such as rabbet, miter, lap, tenon, groove or notched butt type of joint connections could be used, the dovetail joint shown in the drawings is preferred.

As best shown in FIG. 1, joint parts 52,54 comprise the male portion of the dovetail connection. They are vertically offset and oriented ninety degrees from each other. The lower part 52 extends outwardly from stand front side 50 and upwardly from the bottom surface a predetermined distance generally less than one-half the vertical height of the stand. Its cross-sectional shape is defined by a first reference surface 56 inclining outwardly from a first lower side face 57. The first reference surface is a flat planer surface having a longitudinal axis L,L. This axis extends perpendicular to axis S,S of slot reference surface 45. The first reference surface terminates at lower front face 58.

The lower front face is preferably centered in the lower region of the stand and has a polygonal outline. Its opposing edge is defined by the sectioned outer corner 64 of second surface 59. This surface inclines outwardly to the outer corner from second lower side face 60. The second lower side face corresponds to the first lower side face so that the overall lower joint part is bilaterally symmetrical. Both of the lower side faces comprise flat reference surfaces defining a plane that is parallel to slot axis S,S.

Extending outwardly from lower front face 58 is a lower projection 63. This projection extends into recess 79 of adjustment part 15. It interacts with a vertical adjustment means (not shown) of the adjustment part in a manner described in the aforementioned co-pending application Ser. No. 08/288,067.

The second surface is provided with a lower movable insert 61. This insert is actuated by lower handle 62 and functions to engage a corresponding surface on the female joint portion 75 of adjustment part 15.

In the upper half portion of the presetting stand is upper joint part 54. Although it is shown extending outwardly from front side 50, it could extend from either lateral side of the stand. In any case, it should be located above bottom surfaces 42 a distance at least sufficient to avoid contact of vise 16 with table top surface 27 when aligned vertically as shown in FIG. 4.

With further reference to FIG. 1, the upper joint part includes a third reference surface 66 extending at an angle inclined outwardly and upwardly from third upper side face 67. The third reference surface is flat and defines a plane having a longitudinal axis U,U that is parallel to the slot axis S,S and perpendicular to the first reference surface axis L,L.

The third reference surface terminates at its upper outer edge at upper front face 68. The upper front face defines a predetermined flat surface area having a polygonal outline. Its lower edge 65 is defined by the sectioned outer corner of fourth surface 69. This surface corresponds to second surface 59 of the lower joint part. It inclines inwardly and upwardly to a juncture with fourth upper side face 70. This side face extends downwardly and terminates at inner lower edge 74. Note that both upper side faces 67,70 comprise flat reference surfaces. They also define a plane that is parallel to slot axis S,S in the same manner as lower side faces 57, 60.

The fourth surface is provided with an upper movable insert 71 which is actuated by upper handle 72. The movable inserts of both joint parts are mechanically linked to their respective lever arms. When disengaged, their outer surfaces are coextensive with corresponding adjacent surfaces of the inclined surfaces and front faces.

To engage opposing surfaces on the female joint portion, the movable insert moves laterally out from the inclined surface and pushes against the opposing female joint surface. This action simultaneously draws the female reference surface tightly against the respective first or third reference surface of joint parts 52,54. Note also that the upper front face 68 includes an outwardly extending upper projection 73. This projection extends into recess 79 of the adjustment part and functions to permit lateral adjustment of the workpiece subassembly.

The upper and lower joint parts have a cross-sectional profile that is substantially identical to the corresponding female joint portion 75 of the workpiece adjustment part 15. This joint portion includes an adjustment reference surface 76 that is preferably referenced to connecting surfaces of the clamping means shown as vise 16. This will result in quicker, more reliable positioning and precise adjustment of the workpiece. In the embodiment shown, the adjustment part includes a flat underside 78 that defines a plane that is perpendicular to adjustment reference surface 76.

In a similar manner, front faces 25 of vise 16 are flat and define a plane that is perpendicular to the flat vise upper surface 20. Therefore, when the adjustment part is secured to the vise, the front faces 25 will be parallel to the longitudinal axis F,F of the adjustment reference surface.

As shown, the vise connection is accomplished with threaded connector bolts 21 that pass through bolt openings 23 in the vise body. They engage threaded openings 22 in the adjustment part so that the adjustment part can be tightly secured to the vise body.

When the adjustment part is connected to the lower joint part, axis F,F will become parallel to axis L,L. When the adjustment part is secured to the upper joint part, axis F,F will be parallel to axis U,U. This connection will also result in a subassembly orientation that is precisely ninety degrees from the orientation resulting from its engagement with the lower joint part.

The adjustment part includes a preferably flat outer reference face 86,87 on each side of the joint portion 75. These faces extend parallel to axis F,F and are perpendicular to underside 78. When the adjustment part engages the upper and lower joint parts, the outer reference faces matingly engage corresponding upper and lower side faces. This engagement enhances the strength and stability of the joint connection.

In FIGS. 4 and 5, the adjustment part is shown secured to vise 16 which is clamped to workpiece 17. Note that the machine apparatus working area will include a flat machine surface defined by the x, y coordinates. A machine rail will be secured to the machine surface along the x axis. The machine rail will have a cross-section and reference surface identical with rail 28. Therefore, when the presetting stand is attached to the rail, the U,U axis will become parallel to the x axis. Likewise, the L,L axis will become perpendicular to the x axis and parallel to the z axis.

When the joint portion 75 of subassembly 15 is engaged with either of the upper or lower joint parts, adjustment reference surface 76 and the outer reference faces will translate all the above coordinates to the workpiece. However, the stand provides a significant advantage because it remains stationary and aligned while only the subassembly is moved.

As described in Applicant's co-pending application Ser. No. 08/288,067, the rail in the machine apparatus is provided with a rail clamp. The clamp includes a male joint part assembly that is identical to the stand joint parts. Therefore, when the aligned subassembly leaves the presetting station 10 and is reconnected to the machine rail clamp, it will remain precisely aligned to the desired machine coordinates.

In operation, a subassembly is provided which is a duplicate of one used in the machining apparatus. Most commonly, the machining apparatus will be set-up to produce a large number of identical parts. As such, the workpieces being machined will have the same shapes or at least have identical vise engagement regions with orthogonally aligned reference surfaces. In FIGS. 4 and 5, the workpiece is a rectangular-shaped polyhedron. This uniform shape, with orthogonally extending walls, permits direct engagement with the vise jaws and front face against corresponding sides of the workpiece.

With the above polyhedron shape, it is most convenient to secure the workpiece in the vise at one end while the workpiece is resting on top surface 27 of the support table. The subassembly is then manually positioned so that joint portion 75 may be slid down over lower joint part 52 until the subassembly rests upon the aforementioned top surface. Movable insert 61 is then caused to move out of its plane with second surface 59 by actuation of handle 62. This will draw adjustment reference surface 76 against first reference surface 56 causing the entire subassembly into a predetermined alignment relative to machine coordinates x, y and z.

Note that when the workpiece is in place in the lower joint part as depicted in FIG. 4, final truing will be done with respect to the machine coordinates x and y. This is most commonly accomplished by moving a dial indicator, known in the art, along first surface 91 of the workpiece. Corrections are made as needed with the aforementioned lateral, vertical and cant adjustment means. After precise alignment is achieved, the lower handle 62 is again moved to withdraw insert 61 from its cam engagement surface 77.

The subassembly is then lifted up and away from the lower joint part. When thin elongated workpieces are being machined, the subassembly is rotated ninety degrees and moved horizontally onto upper joint part 54 as depicted in FIG. 4. In this position, handle 72 will actuate insert 71 and cause it to move out of the plane of fourth surface 69 and against cam reference surface 77 of the adjustment part. The machine operator will then move the dial indicator along second surface 89 of the workpiece representing its longitudinal axis. This corresponds to the machine z axis in FIG. 4. Adjustments are made where necessary utilizing the lateral, vertical and cant adjustment means.

When thick workpieces are being machined, the subassembly is simply removed from the lower joint part and rotated so that outer reference faces 86 and 87 of the adjustment part can be placed directly on table surface 27. In this position, the machine operator will move the dial indicator along a surface of the workpiece representing its longitudinal axis. This will correspond to the machine z axis. Again, final adjustments are made utilizing the lateral, vertical and cant adjustment means.

The result of the above operation is the complete precision alignment of the workpiece along each of the three orthogonal axes of the machining apparatus. It is thereafter a simple matter to place the subassembly in the machine by releasable attachment to a rail clamp whose orientation has been predetermined relative to the x, y and z axes.

While the invention has been described with respect to preferred embodiments, it will be clear to those skilled in the art that modifications and improvements may be made to the invention without departing from the spirit and scope of the invention. Therefore, the invention is not to be limited by the specific illustrative embodiments, but only by the spirit and scope of the appended claims.

I claim:

1. A workpiece presetting assembly comprising:

a support table having a top surface;

a rail attached to said top surface having a rail reference surface:

an upstanding presetting stand having a bottom surface positioned upon said top surface;

a slot in said bottom surface having a slot reference surface abutting against said rail reference surface;

said presetting stand having a front side that includes an outwardly extending lower joint part having first and second opposing surfaces with at least said first surface comprising a lower reference area having a longitudinal axis that extends perpendicular to the longitudinal axis of said slot reference surface;

said front side including an outwardly extending upper joint part having third and fourth opposing surfaces with at least said third surface comprising an upper reference area having a longitudinal axis that extends perpendicular to the longitudinal axis of said lower reference area.

2. The assembly of claim 1 wherein the longitudinal axes of said rail reference surface corresponds to a predetermined orthogonal axis on said support table top surface.

3. The assembly of claim 2 wherein the longitudinal axis of said upper reference area extends parallel to the longitudinal axis of said slot reference surface.

4. The assembly of claim 1 wherein said open slot extends across said bottom surface and has a cross-sectional shape that is coextensive with said rail.

5. The assembly of claim 4 wherein said slot reference surface comprises a flat back wall of said open slot, said back wall extending perpendicularly from said bottom surface to an oblique wall which extends angularly from said back wall to an apex.

6. The assembly of claim 4 wherein said rail reference surface comprises a flat rear wall which extends upwardly and merges with a top wall which extends angularly to a ridge.

7. The assembly of claim 6 wherein said stand has a back side which includes an opening through which fastening means extends for adjustably securing said stand to said rail.

8. The assembly of claim 7 wherein said fastening means extends at an acute angle with respect to said bottom surface and functions to draw said slot reference surface into abutting relation with said rail reference surface.

9. The assembly of claim 1 including a workpiece adjustment part having a predetermined clamp area which is releasably engagable with either one of said lower joint part and said upper joint part.

10. The assembly of claim 9 wherein each of said second and fourth surfaces include a movable insert means for engaging said predetermined clamp area.

11. The assembly of claim 10 wherein said presetting stand includes a lever means for actuating said insert means.

12. The assembly of claim 11 wherein said lever means includes a pivot shaft having a cam which moves said insert means in and out of the plane of said second and fourth surfaces.

13. In a workpiece presetting stand having means for locating a workpiece at predetermined orthogonal coordinates wherein the improvement comprises said means including at least two joint parts aligned in different orthogonal directions.

14. The presetting stand of claim 13 wherein said joint parts have reference surfaces with respective longitudinal axis that are perpendicular to each other.

15. The presetting stand of claim 14 wherein said joint parts have engagement surfaces with respective movable insert parts.

16. The presetting stand of claim 14 wherein said stand has a bottom reference surface defining a plane that is parallel to the longitudinal axis of at least one of said reference surfaces.

* * * * *